Figures 1, 2, 3:
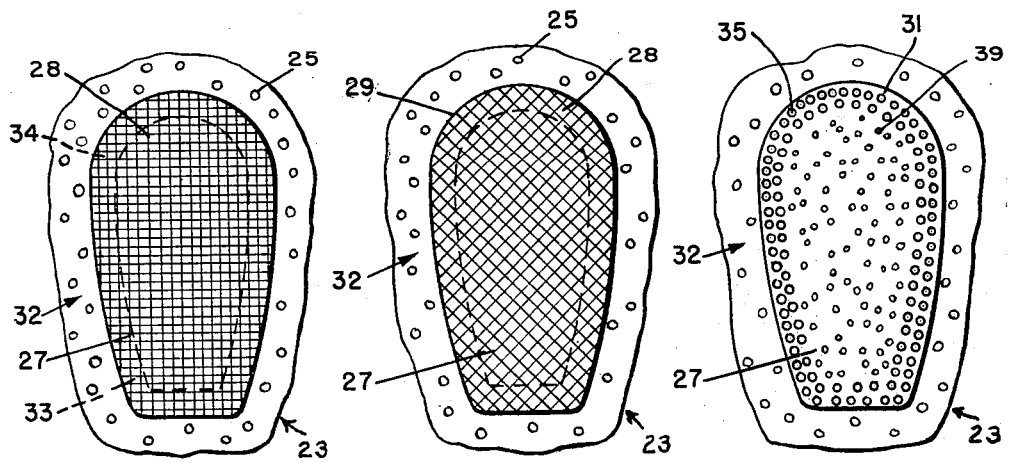

Aug. 4, 1964 A. B. POOLE ETAL 3,143,099
APPARATUS AND METHOD FOR PREVENTION OF SKIN BLISTER IN FOWL
Filed Aug. 2, 1962 2 Sheets-Sheet 1

*INVENTOR.*
ALTON B. POOLE
BY RICHARD S. BRENNEMAN

Pearson + Pearson
ATTORNEYS

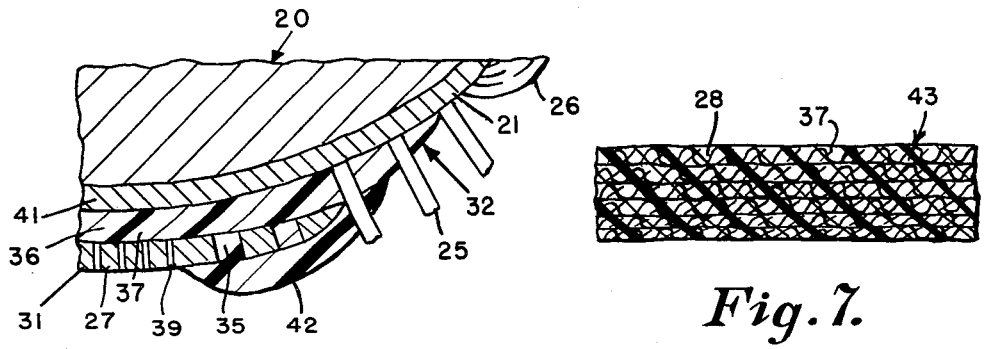
Fig. 6.
Fig. 7.
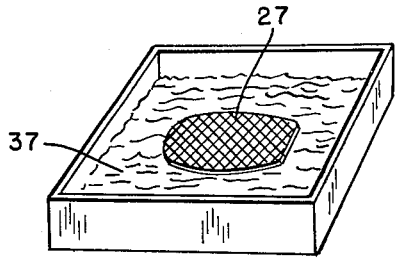
Fig. 8.
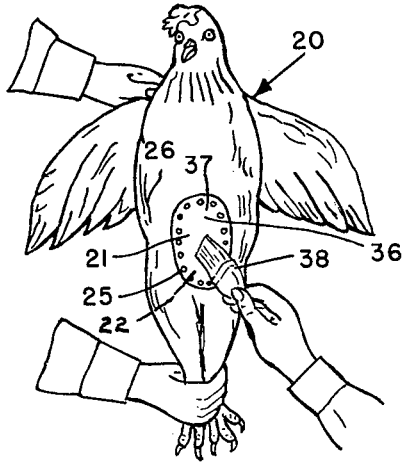
Fig. 9.
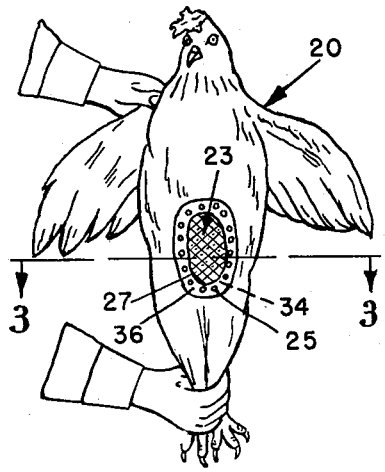
Fig. 10.

United States Patent Office 3,143,099
Patented Aug. 4, 1964

3,143,099
APPARATUS AND METHOD FOR PREVENTION
OF SKIN BLISTER IN FOWL
Alton B. Poole, Abington, and Richard S. Brenneman, Natick, Mass., assignors to Arthur D. Little, Inc., Cambridge, Mass., a corporation of Massachusetts
Filed Aug. 2, 1962, Ser. No. 214,235
17 Claims. (Cl. 119—143)

This invention relates to an improved shield for preventing skin blister in male fowl and to an improved method for affixing such a shield on a fowl.

The desirability of reducing the incidence of skin, or breast blister in cockerels is well recognized in the poultry art. It is discussed in detail in U.S. Patent 3,083,688 of April 2, 1963, to Richard D. Tillotson.

In the aforesaid Tillotson patent, a protective shield of solidified, cohesive material is proposed, the shield covering the exposed skin in the keel bone area of the fowl and being anchored around the quills or shafts of the feathers surrounding the keel bone area. While such shields have produced excellent results, it has been found that under certain temperatures and conditions one or more shields may become subject to cracking off or wearing through, especially along the keel bone probably due to a tendency of the wax-like thermoplastic to cold flow laterally away from the keel bone.

It should be noted that the protection found to be necessary to prevent skin blister in fowl is not of a temporary nature such as the one or two days' protection which might be achieved by coating the unfeathered skin in the keel bone area with a salve or ointment or by affixing court plaster or a plaster of Paris cast thereon.

The protection is required for a period of at least three or four weeks, during which time the fowl is growing at a rapid rate, the shield is likely to be the object of pecking by the fowl itself, or by other fowl, and the shield must remain affixed despite the wear and tear encountered in the relatively crowded, modern poultry house.

It has also been found that any type of shield or protective garment which protrudes outside the feathers will usually be immediately attacked by the fowl, or by other fowl and that the fowl will immediately attempt to pull off any shield which pulls the skin.

It is the principal object of this invention to provide a tough, pliable, integral shield of sheet-like material covering the unfeathered skin of the keel bone area of a male fowl and remaining firmly anchored to, and under, the feathers surrounding the keel bone area until the fowl is of a marketable age.

Another object of the invention is to provide such a shield in the form of an integral, flexible patch of sheet-like material, which may be a synthetic film or a porous woven, or non-woven web, the patch being anchored to the feather quills by a thermoplastic bonding agent.

A further object of the invention is to provide a method for protecting male fowl from skin blister which consists in applying a thermoplastic bonding agent to the feathered skin, and around the feather quills, surrounding the keel bone area and then firmly adhering an integral protective patch on the bonding agent to cover the unfeathered skin.

Still another object of the invention is to provide a shield in the form of an integral sheet, or patch, of permeable porous material impregnated with a thermoplastic bonding agent, the impregnated patch being firmly bonded to a layer of the agent which extends beyond the quills of the adjacent feathers of the fowl.

A still further object of the invention is to provide a tacky, pliable, layer of thermoplastic on the unfeathered skin of the keel bone area of a fowl, the thermoplastic including a plasticizer, a tackifier and a toughener and having a meshed, or perforated, integral patch bonded thereon to minimize lateral migration while forming a wearing surface.

Figure 4:
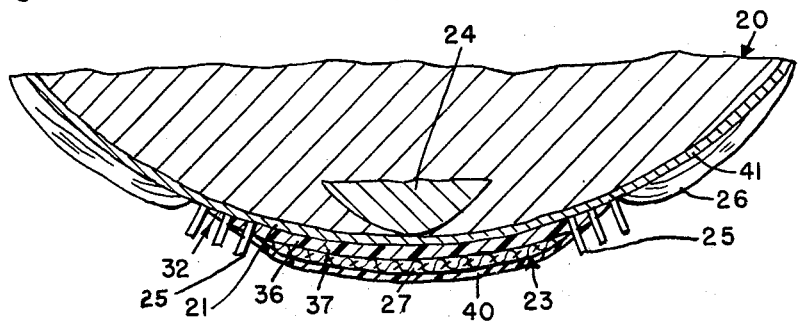
Figure 5:
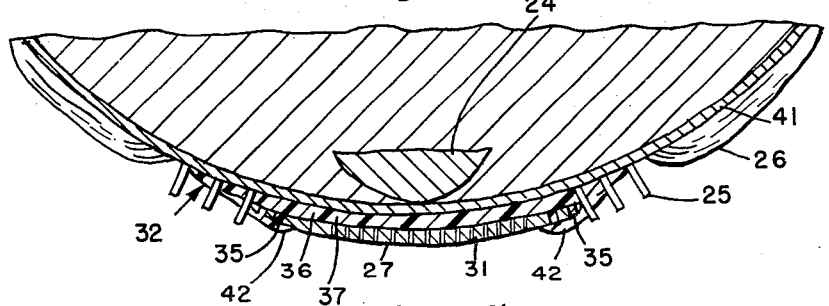

Other objects and advantages of the invention will be apparent from the claims, the description of the drawings and from the drawings in which:

FIGURES 1, 2 and 3 are plan views of three embodiments of the protective patch of the invention, FIG. 4 is an enlarged diagrammatic, part sectional view on line 3—3 of FIG. 10 showing the shield of this invention with the protective patch firmly anchored to the layer of thermoplastic bonding agent, FIG. 5 is a view similar to FIG. 4 but showing a patch of synthetic film material with perforations, FIG. 6 is a further enlarged fragmentary view illustrating the shield shown in FIG. 5, FIG. 7 is a still further enlarged, fragmentary, sectional view showing a multi-layered patch impregnated with bonding agent, FIG. 8 is a diagrammatic view illustrating the step of impregnation of the patches with the thermoplastic bonding agent, FIG. 9 is a diagrammatic view of the step of applying the thermoplastic bonding agent to the feathered skin, and around the feather quills, surrounding the unfeathered skin in the keel bone area of a male fowl, and FIG. 10 is a diagrammatic view illustrating the step of applying the integral, protective patch to the layer of thermoplastic bonding agent.

As shown in FIGURES 9 and 10 male fowl, such as the cockerel 20, have an unfeathered skin area 21 in the keel bone area 22. During the critical period of from about eight weeks of age to about twelve weeks of age, and thereafter until marketed, male fowl tend to develop a skin blister in the area 21 which reduces their market value. It has been found that a shield, or barrier, covering the unfeathered skin 21 can substantially reduce, or eliminate, the development of such skin blister provided it can be economically and practically affixed and can be maintained in position during the above mentioned critical period. The fowl rests on the keel bone area so that any protective covering on that area must be comfortable and non-irritating, able to withstand the chemicals in the litter, firmly secured against removal by moisture, fowl attack, friction or temperature variation and so unobtrusive as to be unnoticed by other fowl. In addition, the shield should be pliable and flexible to conform to the growth of the fowl and apparently it is not essential that it remains in intimate contact with, or adhered to, the unfeathered skin so long as it covers and protects the skin.

The improved shield 23 of this invention is preferably applied to the male fowl, when the cockerels are separated from the pullets, at from eight to eleven weeks of age. At the age of eight to eleven weeks, the unfeathered skin area 21 is usually about two inches wide and four inches long, extending equal distances on each opposite side of the keel bone 24 and extending between the legs of the fowl. The unfeathered skin area 21 is surrounded by feathered skin in which the quills, or shafts, 25 of the feathers 26 are anchored.

The shield 23 includes a preformed, flexible, integral, pliable patch 27 of protective, sheet-like material having structural integrity, resistance to tearing and ability to conform to the contour of the keel bone area 22 of the fowl. It is preferably pre-formed, or cut, in the outline shown in FIGURES 1 and 3 to conform to the outline of the unfeathered skin area 21 but of slightly less dimensions for ease of application. As shown in FIGURE 1, the patch 27 may be of woven, or non-woven, textile cloth material 28, the fibres being natural or synthetic and the cloth being porous and permeable to permit impregnation. As shown in FIGURE 2, when the patch 27 is of woven cloth material, it is preferably cut on the bias as at 29 to better fit the contour of the keel bone area 22 and to reduce unravelling of the edges. The material 28 may have a loose weave such as gauze, scrim, cheesecloth or the like, or a tight weave as percales or the like, or may be any other suitable material having definite structural integrity. As shown in FIGURE 3 the patch 27 may be of synthetic resin film material 31 such as polyethylenes, nylon or the like, or may be formed of elastic type materials such as natural and synthetic rubbers.

The shield 23 also includes thermoplastic bonding agent means 32 extending at least from the outer peripheral portion 33 of the patch 27 to beyond the quills, or shafts, 25 of the feathers 26 surrounding the unfeathered skin 21 for supporting, and anchoring the patch in covering position over the skin 21. The outer peripheral portion 33 of the patch 27 is designated by a dotted line in FIGURES 1 and 2 and a cloth patch 27 will normally remain in position for the full critical period when the underside 34 of the portion 33 is firmly adhered and secured to the exposed outer face of an annular layer of the thermoplastic bonding agent means 32. Similarly a patch 27 of synthetic film, having perforations 35 in the outer peripheral portion will be firmly secured to such a layer for the full critical period. However, as shown in FIGURE 9, it is preferred, and more convenient, to apply a continuous layer, or coating, 36 of the thermoplastic bonding agent 37, by brush, 38 spray or any other suitable manner onto the unfeathered skin area 21, laterally outwardly under the feathers 26 and around the quills 25 and to then affix the entire underside 34 of the patch 27 onto the layer 36, as shown in FIGURE 10. Films such as polyethylene and the like, which are notable for their impermeability to moisture and air preferably have small perforations 39 in their central portion to permit air and moisture to pass through the film.

The bonding agent 37 may be any suitable thermoplastic material which can be applied as a viscous liquid at a temperature which can be tolerated by the fowl. This means that application range of 135-185° F. is normally usable, while from about 140° F. to 170° F. is preferable. The bonding agent 37 should also be one which when reconverted to its solidified form by cooling, i.e. the form which it assumes after application, is somewhat flexible and of course non-irritating to the skin or feathers of the fowl. Inasmuch as the bonding agent 37 will have to function over a period of weeks it should also be one which is capable of exhibiting a certain degree of toughness and integrity in order that no appreciable amount of the edge of the patch 27 becomes exposed which would permit it to be removed.

In order to provide a bonding agent 37 of the character described, it is preferable to incorporate into thermoplastic materials such as paraffin, low-molecular weight polyethylene or various vegetable waxes, certain modifying agents which may include plasticizers, tackifiers and tougheners. All of these additives are known in the art and should be chosen to be compatible with the bonding agent used.

As the name implies, plasticizers give the thermoplastic bonding agent a certain degree of plasticity or flexibility. Among those which may be used are rosin derivatives such as the diethylene glycol ester of rosin, hydroabietyl alcohol and dihydroabietyl phthalate. Of course, any other suitable plasticizer may be used. It appears that it is preferable that the thermoplastic bonding agent possess a certain degree of tackiness in order to make it adhere properly to the skin and to the patch. Tackiness is imparted by the addition of tackifiers such as polyisobutylene, talc or hydrocarbon polymers. Finally, toughening agents are desirable to reduce the cold flow characteristics of the bonding agent and hence to minimize migration of the bonding agent during wear. Tougheners include but are not limited to ethylcellulose, metallic soaps, ethylene-ethyl acrylate copolymers, ethylene-vinyl acetate copolymers, and the like.

Two typical bonding agent compositions are given below (parts are by weight):

Example 1

| | Pts. |
|---|---|
| Wood rosin | 33.5 |
| Diethylene glycol ester of rosin (plasticizer and tackifier) | 33.5 |
| Beeswax | 21.0 |
| Carnauba wax (imparts flow properties) | 3.8 |
| Low molecular weight polyethylene | 1.9 |
| Ethyl cellulose (toughener) | 6.3 |

Example 2

| | |
|---|---|
| Wood rosin | 39.86 |
| Hydroabietyl alcohol (plasticizer and tackifier) | 29.9 |
| Beeswax | 21.92 |
| Ethyl cellulose (toughener) | 8.32 |

These bonding materials have been used with various types of patches, the following examples being illustrative, but not limiting.

Thirty patches of 4-ply cheesecloth were made by impregnating them with the bonding agent of Example 1 at 160° F., and another thirty with the bonding agent of Example 2 at the same temperature. While the patches thus made were kept at about 100° F., thirty 9½-week old cockerels were treated (as described below) with the first bonding agent and thirty with the second. After the bonding agent at 160° F. had been applied to the cockerel's unfeathered skin over the keel bone area, a patch treated with the same agent was placed in position and held firmly until the bonding agent solidified. After two weeks all the patches were in place; and after 4½ weeks when the cockerels had reached maturity as roasting birds, 85% of the patches were in place. The incidence of keel bone blister was 10% as contrasted with an incidence of from 40 to 60% in untreated fowl of the same age raised under identical conditions. Thus, by the process of this invention, keel bone blister was reduced to about ⅓ that normally experienced. Keel bone blisters which resulted in the fowl treated by the process of this invention are believed to be due to the fact that small blisters were already present at the time the patch was applied. Hence, this process for protecting fowl is essentially completely effective provided no blister is present at the time the protective patch is put on.

The patch used in this invention may be applied by several different orders of steps, the essential feature being the bonding of the patch in the position required through the use of the thermoplastic bonding agent to anchor at least the edge of the patch with and around the base of the feather quills so that the thermoplastic material flows around these quills and forms a permanent bond thereto. We do not believe that the patch itself is actually permanently bonded to the unfeathered skin portion but rather, subsequent to application, the patch may separate from the skin, affording movement with respect to it, and hence gives a certain degree of flexibility.

If the patch material is one which can be impregnated with the bonding agent, this is preferably done. Therefore in applying patches which are made of woven and non-woven or textile like materials, such as illustrated in FIGS. 1 and 2, it is preferable to impregnate the patch with the bonding agent 37 in a liquid state, as shown in FIGURE 8, maintaining the treated patch at a temperature of about 100° F. until application to keep it plastic and flexible. The thermoplastic bonding agent is then applied to the fowl, in any suitable manner, as shown in FIGURE 9 or as indicated in the said co-pending application, to the extent that the unfeathered skin is completely covered and the bonding agent extends around substantially all of the quills of at least those feathers which define the border of the unfeathered skin area. Finally, the impregnated patch at about 100° F. is affixed to the unfeathered skin portion as shown in FIGURE 10 and retained in place until the bonding agent has solidified.

The protective patch put on in this manner is shown in FIG. 4. In this figure the feathers which normally cover the keel bone are shown only in the form of quill portions and are not shown in their normal position but pulled back so that the unfeathered skin portion 21 is clearly visible. In FIG. 4, which is a partial cross section, the fowl 20 is seen to have a keel bone 24 and skin 41, the normal unfeathered portion of which is indicated at 21 and extends between feather quills 25. Over the unfeathered portion 21 is placed a coating 36 of the thermoplastic bonding material 37 which is seen to extend beyond the quills 25 which define the area 21. On this coating is then placed the impregnated patch 27 which is seen to be slightly smaller than the unfeathered area. After application the bonding material in the patch adheres to coating 36, thus anchoring the patch 27 to the coating 36 and the entire shield assembly 23 to the fowl 20 by reason of the flowing of the thermoplastic material around the quills 25.

In like manner a patch 27 such as illustrated in FIGS. 1 and 2 may be applied to the fowl without first impregnating the patch with the bonding material. In this case after the patch has been applied to the coating 36 another coating 40 of the bonding material is finally applied over the patch 27 and the bonding material while still in a liquid state impregnates the patch material and bonds it to the coating 36 as in FIG. 4.

In using patch materials which cannot be impregnated with the thermoplastic material, or to which the thermoplastic bonding material does not readily adhere, the patch is applied in the following manner as illustrated in FIG. 5 and in greater detail in FIG. 6. The thermoplastic material is put on as a hot melt coating 36 and then a patch 27 of synthetic film 31 such as shown in FIG. 3 is applied. Around the periphery where holes 35 have been placed in the patch the thermoplastic material flows through the holes 35 and around the top edge of the patch as shown at 42. Thus, there is achieved adequate bonding of the patch to the fowl by means of the thermoplastic rim 42 and the undercoating 36 which are joined through the bonding material in holes 35.

In the preparation of patches made up from gauze-like materials, it has been found preferable to build up multi-layer patches of two or more layers of woven cloth 28, such as gauze, impregnated with and bonded together by the thermoplastic bonding material 37. Such a multi-layered patch 43 is illustrated in FIG. 7 and it would of course replace patch 27 as shown in position in FIG. 4.

While the shield of this invention has been shown and described herein, in what we believe to be the most practical and preferred embodiment, it is recognized that departures may be made therefrom within the scope of the invention without departing from the spirit of the invention and that the invention is not to be limited to the details disclosed herein but is to be accorded the full scope of the claims.

We claim:

1. In combination with a male fowl, a shield for preventing blister on the unfeathered skin of the keel bone area of the male fowl, said shield being of the type anchored under, and around, the base of the feather quills surrounding said keel bone area, the combination of
   a preformed, flexible, integral patch of protective, material substantially coextensive in area with the area of said unfeathered skin, said patch being adapted to cover and shield said unfeathered skin, and
   a thermoplastic, flexible, bonding agent firmly secured to said patch, at least around the periphery thereof, said agent extending outwardly beyond said periphery to beyond the feather quills surrounding said unfeathered skin and being firmly anchored to the bases of said quills
   whereby said patch is held in position covering said unfeathered skin by said bonding agent and by said feather quills.

2. A shield as specified in claim 1 wherein said bonding agent is a continuous layer covering all of the area of said unfeathered skin and wherein all of the area of the underside of said patch is firmly secured and affixed on said layer.

3. A shield as specified in claim 1 wherein the material of said patch is permeable and impregnated with said bonding agent.

4. A shield as specified in claim 1 wherein the material of said patch is a woven textile fabric, having a predetermined structural integrity and cut on the bias to readily conform in shape to the contour of the keel bone area of a fowl.

5. A shield as specified in claim 1 wherein the material of said patch is a synthetic resin film, having a predetermined pattern of perforations around the peripheral portion thereof and said bonding agent is anchored in said perforations.

6. A shield as specified in claim 5 plus a plurality of minute perforations in the central portion of said film for permitting air and moisture to reach said unfeathered skin.

7. A shield as specified in claim 1 wherein said bonding agent is a continuous layer covering all of the area of said unfeathered skin and said patch is of porous sheet material, said bonding agent extending into the pores of said patch for preventing cold flow of said agent in a lateral direction.

8. A shield as specified in claim 1 wherein said thermoplastic bonding agent is a composition containing the following materials in approximately the following proportions by weight:

| | Pts. |
|---|---|
| Wood rosin | 39.86 |
| Hydroabietyl alcohol | 29.9 |
| Beeswax | 21.92 |
| Ethyl cellulose | 8.32 |

9. A shield as specified in claim 1 wherein said thermoplastic bonding agent contains a substantial proportion of ethyl cellulose as a toughening agent to minimize migration of the bonding agent during wear.

10. A shield as specified in claim 1 wherein said thermoplastic bonding agent includes the following materials in approximately the following proportions by weight:

| | Pts. |
|---|---|
| Wood rosin | 33.5 |
| Diethylene glycol ester of rosin | 33.5 |
| Beeswax | 21.0 |
| Carnauba wax | 3.8 |
| Low molecular weight polyethylene | 1.9 |
| Ethyl cellulose | 6.3 |

11. In combination with a male fowl, a shield for preventing blister in the unfeathered skin of the keel bone area of the male fowl the combination of
   a flexible integral patch of sheet-like material conforming in area, and outline to the area and outline of said unfeathered skin, and
   thermoplastic bonding agent means, extending outwardly beyond the area and outline of said patch to form a peripheral portion overlying feathered skin, said peripheral portion firmly anchoring said patch to, and under, the feathers of said fowl, surrounding said unfeathered skin.

12. In combination with a male fowl,
   a flexible, integral patch of sheet-like material adapted to form a protective covering over the unfeathered skin in the keel bone area of said fowl and a
   thermoplastic bonding agent underlying and supporting said patch, said agent having a peripheral portion outside said patch and overlying feathered skin and said portion being firmly anchored in, and around the quills of the feathers surrounding said keel bone area.

13. A combination as specified in claim 12 wherein said patch is of permeable, material with substantial structural integrity and said bonding agent is impregnated into said material for minimizing cold flow, or migration, of said agent during subsequent growth of said fowl.

14. The method of permanently affixing a protective flexible patch of sheet-like material in covering relation on the unfeathered skin of the keel bone area of young male fowl which comprises the steps of affixing a layer of tacky, flexible, thermoplastic bonding agent to, and around, the bases of the quills of the feathers of said fowl, surrounding said unfeathered skin then adhering said protective patch to said layer of tacky bonding agent to cover and overlie only said unfeathered skin and then permitting said layer of bonding agent to solidify into a permanent bond between said patch and said quills.

15. A method as specified in claim 14 plus the step of impregnating said patch with said bonding agent prior to adhering the same to said layer.

16. A method as specified in claim 14 plus the steps of impregnating said patch with said bonding agent and adhering said impregnated patch, while at a temperature of about 100° F., to said layer, while said layer is at a temperature of about 160° F.

17. In combination with a male fowl, a shield for preventing skin blister in the fowl, said shield comprising
- a pliable, integral patch of protective material adapted to cover the unfeathered skin in the keel bone area of said fowl, and
- a slightly tacky, solidified layer of thermoplastic, underlying and supporting said patch but extending outwardly therefrom to overlie feathered skin, said outwardly extending portion firmly anchoring at least the peripheral portion of said patch to the quills of the feathers of said fowl which surround the keel bone area of the fowl.

References Cited in the file of this patent

UNITED STATES PATENTS

| | | |
|---|---|---|
| 693,514 | Haberstroh | Feb. 18, 1902 |
| 733,504 | Nash | July 14, 1903 |
| 2,826,769 | Le Veen | Mar. 11, 1958 |

FOREIGN PATENTS

| | | |
|---|---|---|
| 683,582 | France | Mar. 3, 1930 |